(12) United States Patent
Saripalli

(10) Patent No.: US 9,141,573 B2
(45) Date of Patent: Sep. 22, 2015

(54) POWER-OPTIMIZED INTERRUPT DELIVERY

(71) Applicant: Intel Corporation, Santa Clara, CA (US)

(72) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/278,200

(22) Filed: May 15, 2014

(65) Prior Publication Data

US 2014/0250250 A1 Sep. 4, 2014

Related U.S. Application Data

(63) Continuation of application No. 12/869,192, filed on Aug. 26, 2010, now Pat. No. 8,762,994.

(51) Int. Cl.
| | |
|---|---|
| *G06F 9/46* | (2006.01) |
| *G06F 13/32* | (2006.01) |
| *G06F 9/48* | (2006.01) |
| *G06F 9/50* | (2006.01) |

(52) U.S. Cl.
CPC ............. *G06F 13/32* (2013.01); *G06F 9/4812* (2013.01); *G06F 9/5033* (2013.01); *G06F 9/5055* (2013.01); *G06F 9/5094* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 7,707,341 B1 | 4/2010 | Klaiber et al. | |
| 8,407,387 B2 | 3/2013 | Adachi et al. | |
| 2002/0073131 A1 | 6/2002 | Brenner et al. | |
| 2004/0225790 A1 * | 11/2004 | George et al. | 710/260 |
| 2005/0060462 A1 * | 3/2005 | Ota | 710/260 |
| 2005/0060590 A1 | 3/2005 | Bradley et al. | |
| 2006/0095624 A1 | 5/2006 | Raj et al. | |

(Continued)

FOREIGN PATENT DOCUMENTS

| | | |
|---|---|---|
| JP | 2010086131 | 4/2010 |
| TW | 1309765 | 5/2009 |

(Continued)

OTHER PUBLICATIONS

Chinese Patent Office, Chinese Office Action Mailed Jan. 20, 2015, in Chinese Patent Application No. 201180041092.2.

(Continued)

*Primary Examiner* — Emerson Puente
*Assistant Examiner* — Dong Kim
(74) *Attorney, Agent, or Firm* — Trop, Pruner & Hu, P.C.

(57) ABSTRACT

An apparatus, method, system, and computer-readable medium are disclosed. In one embodiment the apparatus is a processor. The processor includes thread remapping logic that is capable of tracking hardware thread interrupt equivalence information for a first hardware thread and a second hardware thread. The processor also includes logic to receive an interrupt issued from a device, wherein the interrupt has an affinity tied to the first hardware thread. The processor also includes logic to redirect the interrupt to the second hardware thread when the hardware thread interrupt equivalence information validates the second hardware thread is capable of handling the interrupt.

19 Claims, 5 Drawing Sheets

(56) References Cited

U.S. PATENT DOCUMENTS

| | | |
|---|---|---|
| 2006/0112208 A1 | 5/2006 | Accapadi et al. |
| 2010/0138208 A1 | 6/2010 | Hattori et al. |
| 2011/0161541 A1 | 6/2011 | Madukkarumukumana et al. |

FOREIGN PATENT DOCUMENTS

| | | |
|---|---|---|
| TW | 200928710 A | 7/2009 |
| TW | I321005 | 2/2010 |
| WO | 2012/027074 A1 | 3/2012 |

OTHER PUBLICATIONS

Taiwanese Patent Office, Office Action and Search Report mailed Jan. 22, 2014 in Taiwanese application No. 100127725.

International Search Report and Written Opinion received for PCT Patent Application No. PCT/US2011/046255, mailed on Feb. 9, 2012, 9 Pages.

Korean Patent Office, Office Action mailed May 1, 2015, in Korean Patent Application No. 10-2013-7004633.

\* cited by examiner

POWER-OPTIMIZED INTERRUPT DELIVERY

This application is a continuation of U.S. patent application Ser. No. 12/869,192, filed Aug. 26, 2010, the content of which is hereby incorporated by reference.

FIELD OF THE INVENTION

The invention relates to interrupt remapping for hardware thread power optimizations.

BACKGROUND OF THE INVENTION

A hardware thread (e.g., an operational core within a processor) may have the capability of entering into a power optimized state, such as a low power sleep or deep sleep state. Input/Output (I/O) traffic may send an interrupt to the hardware thread, which would generally cause the thread to wake out of the low power state to service the interrupt. For example, interrupts requiring the hardware thread to wake up may come from a Platform Component Interconnect (PCI)-Express device, a PCI device, or an input/output advanced programmable interrupt controller (IOAPIC) among others. When these interrupts arrive frequently and each of them requires the hardware thread to wake up, the purpose of putting the hardware thread into a power optimized state is defeated.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a processor, system, method, and computer-readable medium capable of power-optimizing interrupt delivery are disclosed.

A computer system may include several hardware threads. If a hardware thread is thought of as a core within a processor, in a multi-processor system where each processor has several cores, there are potentially many hardware threads. A hardware thread may have the capability to enter into a low power state when it is not required to be working. The more hardware threads that are in low power states, the lower the overall power consumption of the computer system becomes.

When an I/O interrupt takes place that requires a specific hardware thread for servicing, the targeted hardware thread would generally be woken up, which would negate the ongoing power savings of the sleeping hardware thread. Thus, thread remapping logic may be present within the computer system that keeps track of the power state of each hardware thread as well as the interrupt equivalency handling of each hardware thread. For example, for a given interrupt, there may be four different threads that can all handle that interrupt. Thus, if the interrupt is targeting a first hardware thread and that first thread is in a low power state, the thread remapping logic may search for another hardware thread that is available and can handle the interrupt. If an equivalent thread for interrupt handling purposes is available, then the thread remapping logic will transfer/remap the interrupt to have the other found hardware thread handle the interrupt, thereby allowing the originally targeted hardware thread to remain in the low power state.

Figure 1:
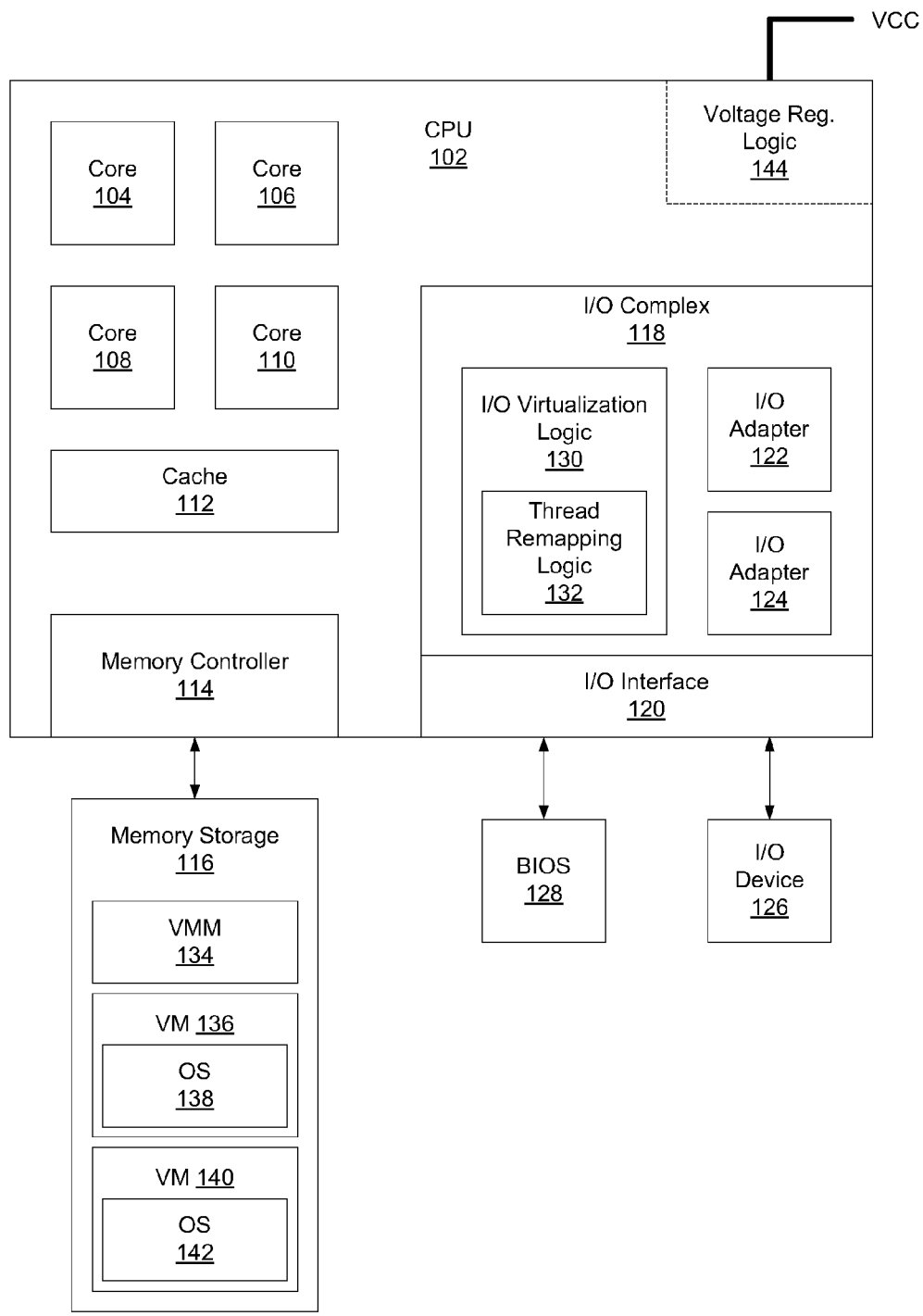
FIG. 1 illustrates an embodiment of a computer system capable of power-optimizing interrupt delivery.

FIG. 1 illustrates an embodiment of a computer system capable of power-optimizing interrupt delivery.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs), also referred to as "processors." Although in many embodiments there are potentially many CPUs, in the embodiment shown in FIG. 1 only CPU 102 is shown for clarity. CPU 102 may be an Intel® Corporation CPUs or CPUs of another brand. CPU 102 includes one or more cores in different embodiments. CPU 102 is shown including four cores (Cores 104, 106, 108, and 110).

In many embodiments, each core includes internal functional blocks such as one or more execution units, retirement units, a set of general purpose and specific registers, etc. In a single-threaded core, each core may be referred to as a hardware thread. When a core is multi-threaded or hyper-threaded, then each thread operating within each core may also be referred to as a hardware thread. Thus, any single thread of execution running in the computer system 100 may be referred to as a hardware thread. For example, in FIG. 1, if each core is single-threaded, then there are four hardware threads present in the system (four cores). On the other hand, if each core is multi-threaded and has the capability of maintaining the states of two threads simultaneously, then there are eight hardware threads present in the system (four cores with two threads per core).

CPU 102 may also include one or more caches, such as cache 112. In many embodiments that are not shown, additional caches other than cache 112 are implemented so that multiple levels of cache exist between the execution units in each core and memory. In different embodiments cache 112 may be apportioned in different ways. Additionally, cache 112 may be one of many different sizes in different embodiments. For example, cache 112 may be an 8 megabyte (MB) cache, a 16 MB cache, etc. Additionally, in different embodiments the cache may be a direct mapped cache, a fully associative cache, a multi-way set-associative cache, or a cache with another type of mapping. In many embodiments, cache 112 may include one large portion shared among all cores or may be divided into several separately functional slices (e.g., one slice for each core). Cache 112 may also include one portion shared among all cores and several other portions that are separate functional slices per core.

In many embodiments, CPU 102 includes an integrated system memory controller 114 to provide an interface to communicate with system memory 116. In other embodiments that are not shown, memory controller 114 may be located in a discrete elsewhere in computer system 100.

System memory 116 may comprise dynamic random access memory (DRAM), such as a type of double data rate (DDR) DRAM, non-volatile memory such as flash memory, phase change memory (PCM), or another type of memory technology. System memory 116 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link (i.e., bus, interconnect, etc.) that couples CPU 102 with system memory 116 may include one or more optical, metal, or other wires (i.e. lines) that are capable of transporting data, address, control, and clock information.

I/O complex 118 (e.g., an I/O controller hub) includes an I/O interface 120 that enables communication between the CPU 102 and external I/O devices. The complex may include one or more I/O adapters, such as I/O adapters 122 and 124. I/O adapters translate a host communication protocol utilized within the CPU 102 to a protocol compatible with a particular I/O device, such as I/O device 126. Some of the protocols that a given I/O adapter may translate include a Peripheral Component Interconnect (PCI), Universal Serial Bus (USB), IDE, SCSI, and 1394 "Firewire," among others. Additionally, there may be one or more wireless protocol I/O adapters. Examples of wireless protocols are Bluetooth, IEEE 802.11-based wireless protocols, and cellular protocols, among others.

In many embodiments, a BIOS 128 (basic input/output system) is either integrated into the I/O complex 118 or coupled to the I/O complex 118. The BIOS is firmware stored in the computer system that contains instructions to initialize key computer system components during a boot process.

Although not shown for sake of clarity, the CPU may have additional interfaces, such as high speed I/O interfaces to handle graphics and network traffic. In many embodiments, these high speed I/O interfaces may include one or more PCI-Express interfaces.

In many embodiments, computer system 100 includes hardware and software logic capable of providing a virtualized environment with one or more guest operating systems (OSs) running in virtual machine (VM) environments. A virtual machine monitor (VMM) or hypervisor may be implemented in logic within the system to isolate each VM's operating environment so each VM, and the OS and applications running within it, is isolated from and unaware of other VMs present in the system. For example, in some embodiments, VMM 134, present in memory storage 116 may manage the resources for VM 136 and VM 140, as well as OS 138 and OS 142 running on each VM, respectively.

Also, CPU 102 may include voltage regulation logic 144 that regulates the power (VCC) supplied for the CPU 102.

To create a seamless virtualized environment, virtualized I/O is generally utilized. I/O virtualization logic 130 provides the ability to virtualize and isolate I/O devices in the I/O subsystem, such as I/O device 126. In some embodiments, I/O virtualization logic 130 includes Intel® VT-d architecture. In other embodiments, another type of memory mapped I/O technology is utilized, such as an x86 or non-x86 class IOMMU setup.

Device transfers (DMAs) and interrupts that are initiated by an I/O device are the key processes that require device isolation to a given VM. In many embodiments, I/O virtualization logic 130 may enable system software to create multiple DMA protection domains. A protection domain is an isolated environment to which a subset of the system memory is allocated. Depending on the software usage model, a DMA protection domain may represent memory allocated to a VM, or the DMA memory allocated by a guest-OS driver running in a VM or as part of the VMM/hypervisor itself. The I/O virtualization logic 130 may enable system software to assign one or more I/O devices to a protection domain. DMA isolation is achieved by restricting access to a protection domain's physical memory from I/O devices not assigned to it.

For interrupt handling, I/O virtualization logic 130 may modify the interrupt-message format to be a DMA write request that includes a "message identifier" and not the actual interrupt attributes. The write request, like any DMA request, may specify the requester-id of the I/O device function generating the interrupt. Then, when the interrupt request is received by the I/O virtualization logic 130, the interrupt is remapped through a table structure of interrupts. Each entry in the interrupt-remapping table corresponds to a unique interrupt message identifier from a device, including any necessary interrupt attributes (e.g., destination CPU, vector, etc.).

In the embodiment shown in FIG. 1, I/O virtualization logic 130 receives requests from one or more I/O devices through the I/O interface 120. The I/O virtualization logic 130 handles these requests, as described above, prior to allowing them to pass through to the memory controller 114.

In many embodiments, such as the embodiment shown in FIG. 1, thread remapping logic (TRL) 132 is present within the I/O virtualization logic 130. In other embodiments, TRL 130 is present elsewhere in computer system 100, such as in another location within CPU 102 or possibly even external to CPU 102 altogether, which is shown in FIG. 2.

Figure 2:
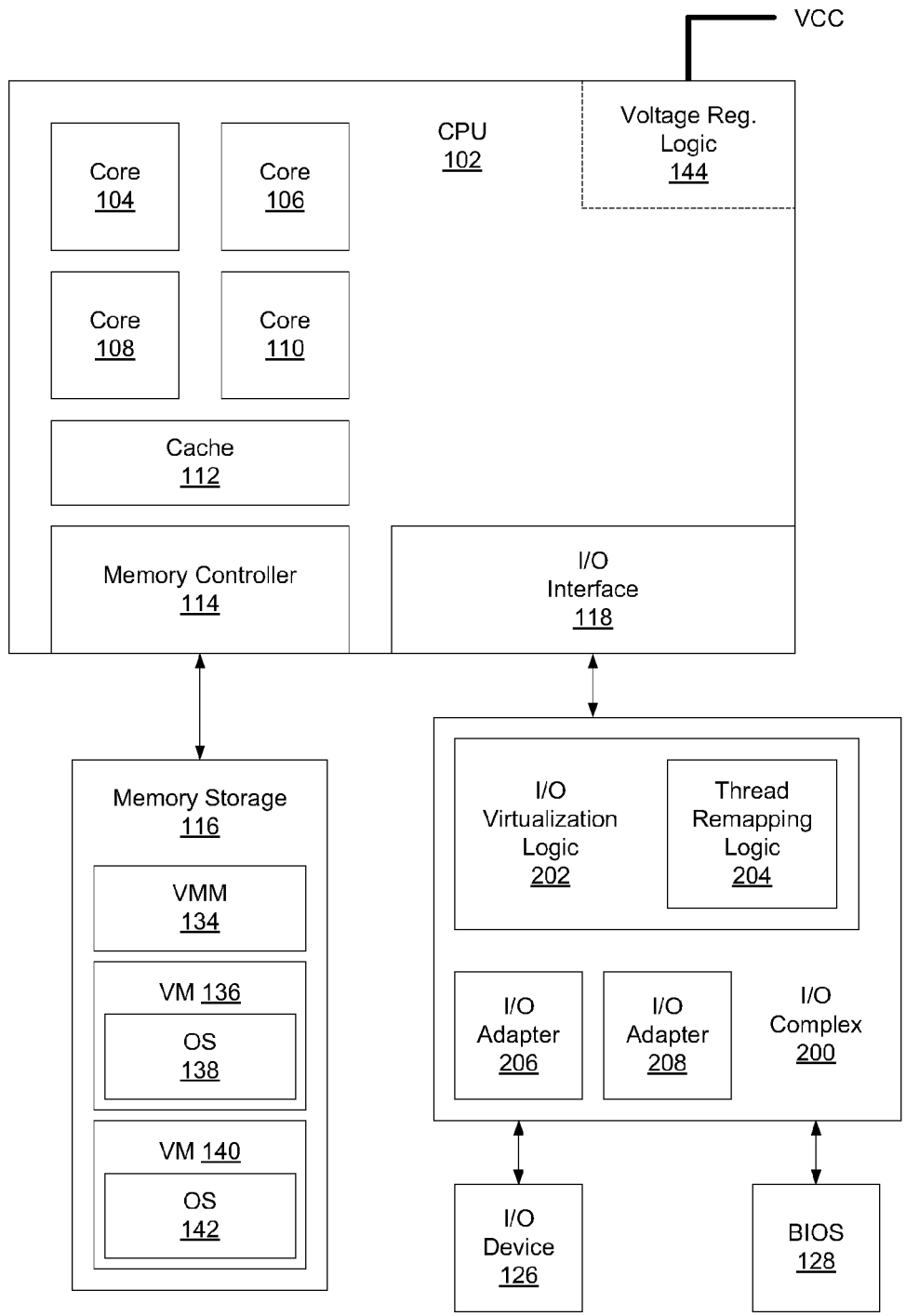
FIG. 2 illustrates another embodiment of a computer system capable of power-optimizing interrupt delivery.

FIG. 2 illustrates another embodiment of a computer system capable of power-optimizing interrupt delivery.

In the embodiment shown in FIG. 2, the CPU 102 is similar to the CPU in FIG. 1, except I/O complex 200 is different in that it is located external to CPU 102. I/O Complex 200 includes I/O virtualization logic 202 and TRL 204, which perform the same functions as they do as described in FIG. 1, only from location external to the CPU 102. I/O adapters 206 and 208 also perform the same functions, namely providing a communicative interface to one or more I/O devices, such as I/O device 126. In many embodiments, I/O complex 200 is a discrete I/O controller hub located on a system motherboard and coupled to CPU 102 through a series of copper, optical, or other physical types of lines/wires.

Returning to FIG. 1, the TRL 132 performs several functions. First, logic in TRL 132 tracks the current power state of each hardware thread. Many computer systems implement an ACPI (Advanced Configuration and Power Interface) power management scheme. ACPI enables an industry-standard form of power management and is potentially implemented within software, the BIOS, and hardware. At any given time, a hardware thread is in one of many power states or is transitioning between two power states. The number of power states that a hardware thread is capable of entering is implementation specific. For example, some of the states a hardware thread may be in are C0 (full operation), C1 (halt), C2 (stop-clock), C3 (sleep), and deeper sleep states such as C4 and C6. Other power optimized states may utilize MONITOR and MWAIT threading instructions. Each power state that a hardware thread is capable of entering has a differing amount of functionality or lack thereof. Generally, the more extensive the power savings, the longer it takes to transition a hardware thread out of the state.

Limiting or entirely blocking interrupts sent from an I/O device to a hardware thread that is attempting to enter into or stay within a power savings state will generally save system power. The problem is that a device needs its interrupts serviced. Therefore, redirecting incoming I/O device interrupts to alternate hardware threads that are not in power savings states may help maintain system power savings by allowing the originally targeted thread to stay in a low power consumption state.

The TRL 132 has access to a list, table, or other type of data structure that stores information about hardware threads that are compatible with servicing each type of interrupt. In other words, for a given type of interrupt, there will be a set of hardware threads capable of servicing the interrupt in question. For example, if a certain interrupt (e.g., interrupt type "A") is able to be serviced by hardware threads 1 and 2, the interrupt-type table under that particular interrupt would have hardware threads 1 and 2 present. Therefore, if an I/O device, such as I/O device 126, sends an "A" interrupt to hardware thread 1 and hardware thread 1 is in a low power state, then TRL 132 may transparently remap the interrupt target from hardware thread 1 to hardware thread 2. An OS or VMM may be capable of configuring the set of hardware threads capable of handling a given type of interrupt. The set of hardware threads capable of handling a given interrupt may be based on thread affinity, cache sharing topologies, or other static or dynamic factors.

Figure 3:
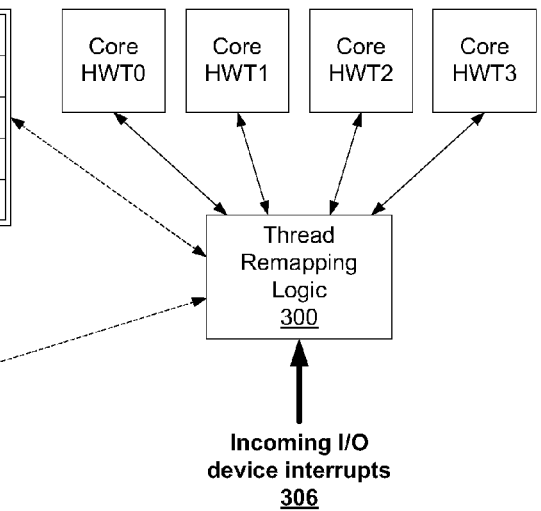
FIG. 3 illustrates a data structure that stores a matrix of hardware thread/interrupt type equivalence information as well as a data structure that stores each hardware thread's current power state.

FIG. 3 illustrates a data structure that stores a matrix of hardware thread/interrupt type equivalence information as well as a data structure that stores each hardware thread's current power state.

As discussed above, the hardware thread/interrupt type equivalence matrix table stores information as to the set of threads that are capable of handling a given interrupt type. In the embodiment shown in FIG. 3, there are four cores (Cores 0-3) for which thread remapping logic 300 has access to information. The hardware thread/interrupt type matrix table 302 includes a list of hardware threads that are compatible with handling a given type of interrupt. For example, interrupt type A is able to be handled by all hardware threads present, whereas interrupt type B can be handled only by hardware threads 0 and 2.

Hardware thread current power state table 304 includes the current power state of each hardware thread. For illustrative purposes, the table is only showing whether each thread is awake or asleep, though in practice, there may be many states that are capable of being listed. For example, a thread may be in any C-state of power (e.g., C1, C2, C6, etc.).

When an incoming I/O device interrupt 306 reaches TRL 300, the TRL may look first at the at the Hardware thread current power state table 304 to see if the target hardware thread is awake or asleep. If the hardware thread is awake, then TRL 300 may just send the interrupt on to the originally targeted hardware thread. On the other hand, if the originally targeted hardware thread is not awake, TRL 300 may then look at the hardware thread/interrupt type matrix table 302 for thread handling equivalence and find another hardware thread capable of handling the incoming interrupt and if another capable hardware thread is available, then TRL 300 may remap the interrupt to the capable and available (i.e., non-sleeping) thread).

In many embodiments, a TRL is present within each CPU present in the system, so a multi-socket computer system, there are multiple TRLs.

Figure 4:
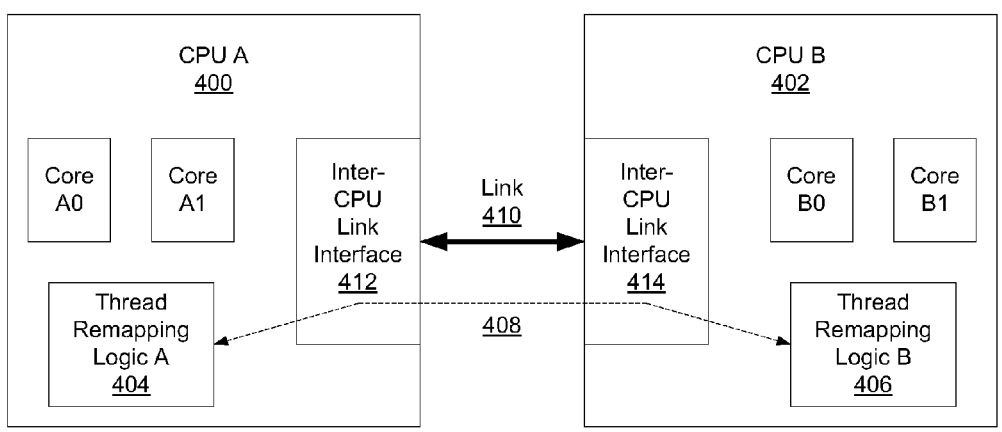
FIG. 4 illustrates an embodiment of a two socket computer system capable of power-optimizing interrupt delivery.

FIG. 4 illustrates an embodiment of a two socket computer system capable of power-optimizing interrupt delivery.

In the embodiment shown in FIG. 4, there are two CPUs present (CPU A 400 and CPU B 402). Additionally, each CPU includes two cores (cores A0 and A1 within CPU A 400 and cores B0 and B1 within CPU B 402). Furthermore, CPU A 400 includes TRL A 404 and CPU B 402 includes TRL B 406. In many embodiments, each TRL includes its own local copy of the hardware thread/interrupt type matrix table (302 in FIG. 3) and hardware thread current power state table (304 in FIG. 3). Although there are multiple copies of these tables, the information within these tables should be uniform across the copies so each TRL has the same information. These mirror copies of information within these two tables may be maintained by inter-CPU broadcast messages 408 that are broadcast over an inter-CPU link 410 coupled to an inter-CPU link interface on each CPU (interface 412 on CPU A 400 and interface 414 on CPU B 402).

For example, when a hardware thread is transitioned between two power states, a power state transition message may be broadcast across the inter-CPU interconnect to all TRLs present in the computer system. Each TRL may latch onto this message and update its locally stored hardware thread current power state table (item 304 in FIG. 3) to show the new power state into which the hardware thread in question has transitioned.

In some embodiments, the hardware thread that is transitioning between power states broadcasts its own message to all TRLs. In other embodiments, the hardware thread that is transitioning between power states sends the transition information to the local TRL, which in turn broadcasts the state transition to all other TRLs.

Figure 5:
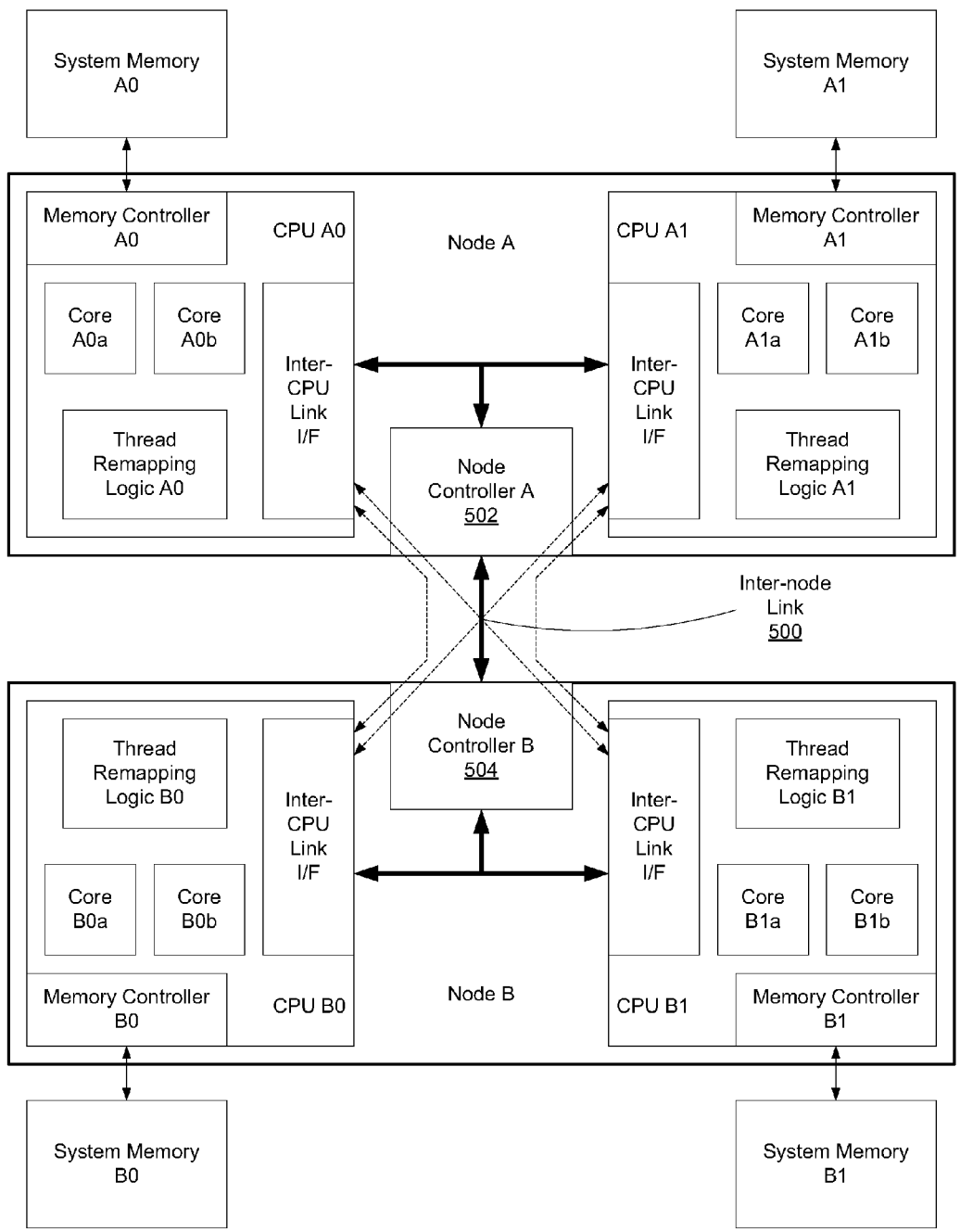
FIG. 5 illustrates an embodiment of a two node computer system capable of power-optimizing interrupt delivery.

FIG. 5 illustrates an embodiment of a two node computer system capable of power-optimizing interrupt delivery.

In the embodiment shown in FIG. 5, there are two nodes present (Node A and Node B). Node A includes two CPUs (CPU A0 and CPU A1). Each CPU includes two cores: cores A0a and A0b in CPU A0, cores A1a and A1b in CPU A1, cores B0a and B0b in CPU B0, and cores B1a and B1b in CPU B1. Node A and node B are coupled through inter-node link 500. A node controller is present in each node. Node controller A 502 helps manage node A and node controller B help manage node B. Inter-node communication traffic needs to be routed through each respective node controller. Thus, a message sent by a hardware thread when it transitions to a power state are capable of being routed between nodes through the node controllers (depicted by the dashed lines routed between the two nodes).

Figure 6:
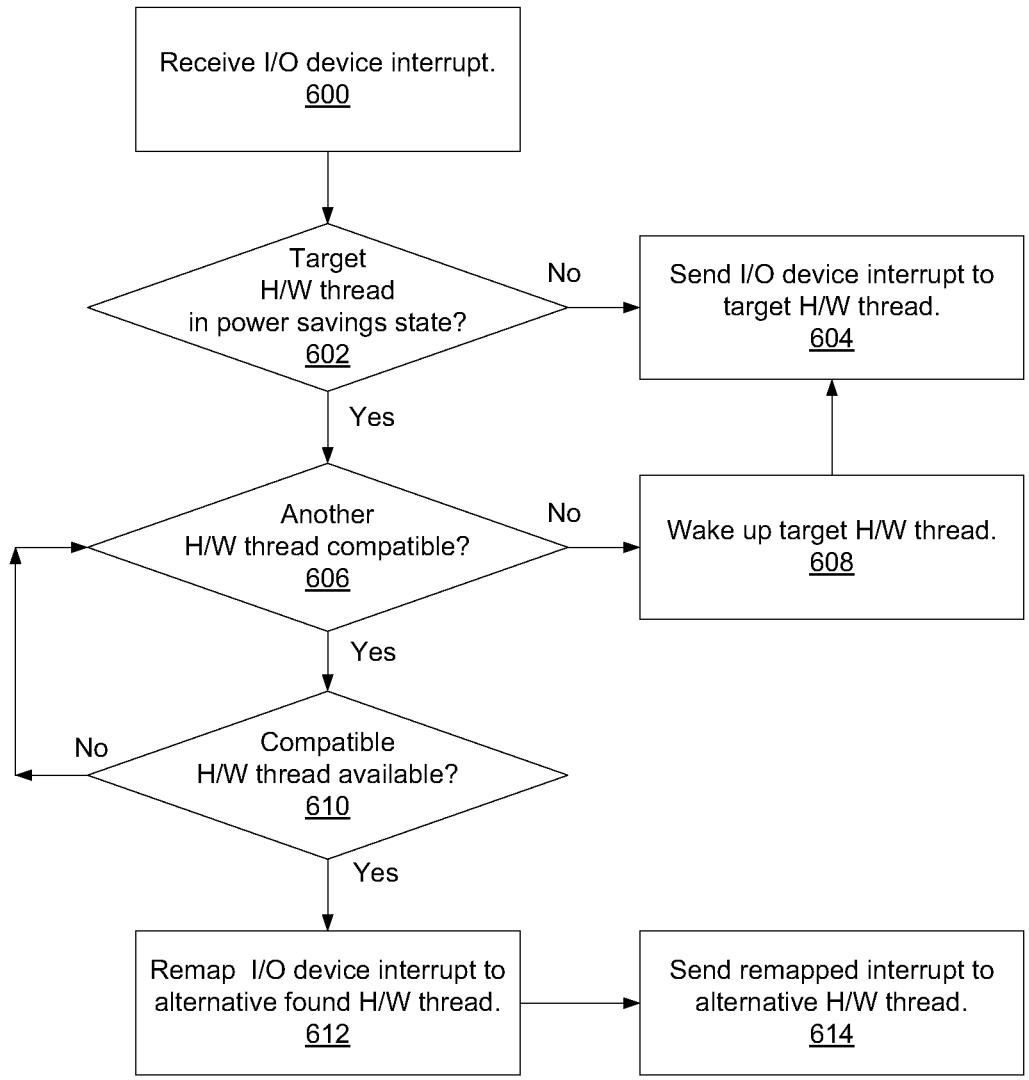
FIG. 6 is a flow diagram of an embodiment of a process to power-optimize interrupt delivery.

FIG. 6 is a flow diagram of an embodiment of a process to power-optimize interrupt delivery.

The process is performed by processing logic, which may be performed by hardware, software, firmware, or any combination of the listed types of processing logic. The process begins by processing logic receiving an I/O device interrupt (processing block 600).

Processing logic then determines whether the hardware thread that is the target of the interrupt (i.e., the interrupt has affinity to the thread) is in a power savings state (processing block 602). If the target hardware thread is not in a power savings state, then processing logic may simply send the I/O device interrupt to the originally targeted hardware thread (processing block 604).

On the other hand, if the target hardware thread is in a power savings state, then processing logic then determines if another hardware thread is compatible (i.e., obtained from hardware thread equivalence information accessible to the processing logic, such as within a hardware thread/interrupt type equivalence matrix 302 in FIG. 3) (processing block 606).

In the embodiment shown in the FIG. 6 process flow, if there is not a compatible hardware thread, then processing logic wakes up the target hardware thread (processing block 608) and sends the interrupt to the target hardware thread 604. In other embodiments not shown, processing logic may hold the interrupt until an equivalent CPU hardware thread becomes available (subject to ordering requirements).

If there is a compatible hardware thread, then processing logic determines whether the compatible hardware thread is available (processing block 610). For example, there may be a compatible hardware thread but that thread is also in a deep sleep power savings state and therefore not readily available. In many embodiments, there are rank orders of power savings states so that if two separate compatible threads are both in power savings states, processing logic may wake up the thread that is in the least "deep" state so the deeper sleeping thread is allowed to maintain its sleep state. This would accomplish two things simultaneously. First, the deeper sleeping thread, which is saving additional system power is allowed to stay in the greater power savings mode. Second, the thread in the less deep sleep state may be capable of transitioning into the awake state with a smaller latency since the deeper the sleep state generally leads to a longer wake up latency.

Returning to the process illustrated in FIG. 6, if the compatible hardware thread is not available, then processing logic returns to block 606 to determine if there is yet another compatible hardware thread. Otherwise, if the compatible thread is available, then processing logic remaps the I/O device interrupt to the alternative equivalent hardware thread that was found (processing block 612) and sends the remapped interrupt to that alternative hardware thread (processing block 614).

Essentially, processing logic is capable of transitioning an interrupt from one hardware thread to another hardware thread in a transparent manner (i.e., wherein the I/O device is essentially unaware of the transition between threads for handling of the interrupt).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A processor comprising:
   a first core and a second core; and
   thread remapping logic coupled to the first and second cores to:
   track hardware thread interrupt equivalence information for a first hardware thread and a second hardware thread via a first table including a plurality of entries each to identify one or more hardware threads capable of handling a given interrupt type;
   track power state information for the first and second hardware threads, including whether the first or second hardware thread is in a power savings state via a second table including a plurality of entries each to identify a current power state of a given hardware thread;
   receive an interrupt issued from a device while the first hardware thread is in the power savings state, wherein the interrupt is targeted to the first hardware thread; and
   responsive to a determination that the first hardware thread is in the power savings state, redirect the interrupt to the second hardware thread when the thread remapping logic determines that the second hardware thread is capable of handling the interrupt.

2. The processor of claim 1, wherein the first hardware thread is further operable to send a power transition message, to signify a change in a power state at which the first hardware thread operates, to the second hardware thread in response to the first hardware thread power state change.

3. The processor of claim 2, wherein the first hardware thread is present in the processor and the second hardware thread is present in a second processor, the power transition message to be sent across an inter-processor communication link coupled to the processor and the second processor.

4. The processor of claim 3, wherein the hardware thread interrupt equivalence information and the power state information for each of the first and second hardware threads is to be tracked concurrently in a second thread remapping logic present in the second processor.

5. The processor of claim 1, wherein the redirection of the interrupt from the first hardware thread to the second hardware thread is to occur at least when the first hardware thread is in a first low power state and the second hardware thread is in a full operation state.

6. The processor of claim 1, wherein the redirection of the interrupt from the first hardware thread to the second hardware thread is to occur at least when the first hardware thread is in a first low power state and the second hardware thread is in a second low power state, the first low power state deeper than the second low power state.

7. The processor of claim 1, wherein the thread remapping logic is further operable to transparently allow the device to continue normal operation without programmed interrupt redirection when the first hardware thread transitions into a low power state.

8. The processor of claim 1, wherein the thread remapping logic is to redirect the interrupt transparently to the device.

9. The processor of claim 1, further comprising virtualization logic to isolate the device to a first virtual machine, wherein the virtualization logic is to modify the interrupt to a direct memory access (DMA) write request.

10. The processor of claim 1, wherein the first hardware thread is associated with the first core and the second hardware thread is associated with the second core.

11. The processor of claim 1, wherein the processor comprises a shared cache and a memory controller.

12. The processor of claim 1, wherein the thread remapping logic is to access the first and second tables in redirection of the interrupt.

13. The processor of claim 1, wherein the hardware thread interrupt equivalence information comprises information to indicate a capability of a hardware thread to handle a given interrupt type.

14. A non-transitory machine-readable medium having stored thereon instructions, which if performed by a machine cause the machine to perform a method comprising:
    tracking hardware thread interrupt equivalence information for a first hardware thread and a second hardware thread, the hardware thread interrupt equivalence information including information to indicate a capability of a hardware thread to handle a given interrupt type obtained from a first table including a plurality of entries each to identify one or more hardware threads capable of handling the given interrupt type;
    sending a power transition message, signifying a change in a power state that the first hardware thread operates within, in response to the first hardware thread changing power states;
    tracking power state information for the first and second hardware threads via a second table including a plurality of entries each to identify a current power state of a given hardware thread;
    receiving an interrupt issued from a device and targeted to the first hardware thread; and
    redirecting the interrupt to the second hardware thread based at least in part on the hardware thread interrupt equivalence information.

15. The non-transitory machine-readable medium of claim 14, wherein the method further comprises redirecting the interrupt from the first hardware thread to the second hardware thread at least when the first hardware thread is in a low power state and the second hardware thread is in a full operation state.

16. The non-transitory machine-readable medium of claim 14, wherein the method further comprises transparently allowing the device to continue normal operation without programmed interrupt redirection when the first hardware thread transitions into a low power state.

17. A system comprising:
    a first processor including a first hardware thread;
    a second processor including a second hardware thread;
    a first storage to store hardware thread interrupt equivalence information for at least the first hardware thread and the second hardware thread to indicate capability to handle a given interrupt type;
    a second storage to store power state information for at least the first hardware thread and the second hardware thread; and
    a first thread remapping logic unit to:
        track the hardware thread interrupt equivalence information for the first hardware thread and the second hardware thread;
        track the power state information for the first and second hardware threads;
        receive an interrupt issued from a device, wherein the interrupt is targeted to the first hardware thread; and
        redirect the interrupt to the second hardware thread based on the hardware thread interrupt equivalence information and the power state information.

18. The system of claim 17, wherein the hardware thread interrupt equivalence information and the power state information for each of the first and second hardware threads is tracked to be concurrently in a second thread remapping logic present in the second processor.

19. The system of claim 17, wherein the first and second processors comprise cores of a multicore processor.

* * * * *